May 23, 1961

A. BELTRAMI 2,985,872

ELECTRONIC DEVICE

Filed Feb. 11, 1955

2 Sheets-Sheet 1

INVENTOR
AURELIO BELTRAMI

BY Ostrolenk & Faber
ATTORNEYS

May 23, 1961

A. BELTRAMI 2,985,872

ELECTRONIC DEVICE

Filed Feb. 11, 1955

2 Sheets-Sheet 2

INVENTOR
AURELIO BELTRAMI

BY Ostrolenk & Faber
ATTORNEYS

United States Patent Office 2,985,872

Patented May 23, 1961

2,985,872

ELECTRONIC DEVICE

Aurelio Beltrami, Via Circo 4, Milan, Italy

Filed Feb. 11, 1955, Ser. No. 487,627

Claims priority, application Italy Oct. 23, 1954

7 Claims. (Cl. 340—345)

The present invention relates to electronic devices operating by photo- or radio-electric transduction, adapted to supply electric voltages or currents variable according to any wanted predetermined diagram and particularly suitable for controlling machines or apparatus either mechanical, electrical, telephonic, electronic, chemical, textile, or of other nature, as well as varied automatic or semi-automatic processes of any kind, and also for generating electric voltages or currents of any wave form and frequency, from the very low to the very high ones, and for multiplying or dividing them by any, even not whole figure. More precisely; the present invention concerns an electronic device whereby it is possible, in an easy, quick, and exceptionally cheap way, to obtain electric voltages variable according to any desired predetermined schedule, and electric voltages, alternating or uni-directional, with very varied wave forms and having frequencies, from very limited values to extremely high ones, and indeed through very simple elements of reliable operation.

A device according to the present invention comprises a movable member carrying a curve or diagram, capable of varying, by transparency or by reflection, the intensity of a visible or unvisible radiation of any whatever frequency, emitted by an apposite source and directed so as to strike a photo- or radio-electric transductor, i.e. a transductor capable to transform the variations of intensity or frequency of said radiations into electric current or voltage variations, such as a photo-electric cell, a photo-electric multiplier, a thermo-electric couple and the like.

Such electric quantities, eventually amplified by means of a suitable amplifier, combined with the photo- or radio-electric transductor, are actually variable according to the curve or diagram carried by the movable member, and can be used to control the operation of a desired machine, or apparatus, or an electronic brain, or any whatever calculating machine, or else to generate electric voltages having predetermined form and frequency.

In particular, the device in question can be utilized with advantage to control machine tools and electronic welding machines, calculating machines, or to materialize electronic brains, so-called industrial "robots" or toy "robots," or to control experimental laboratory equipments, or to generate lines of delay or impulses for electronic telephone circuits in coaxial cables or radio-bridges, to generate radar impulses, even of very short duration, or impulse scanning systems, either interlaced or not, for TV transmitters, to realize and control experimental laboratory apparatus, and to generate, through simple means, alternating or uni-directional electric voltages of any form and frequency, as for instance from a ten-thousandth of cycle per second (i.e. one complete cycle in ten thousand seconds) down to millimetric or fractions of millimeter waves (frequencies up to millions of megahertz and over).

In such cases where it is needed to generate impulses of very short duration (as for instance of micro-seconds, tenths or hundredths of micro-second) or else very short cycle oscillatory currents (centimetric, and millimetric or micro-metric waves) the use of light radiations is unpractical because it would necessitate the use of large size movable members and remarkable sliding speeds of the movable member. In such cases, the electronic curves of diagrams, drawn or reproduced in any way on paper or the like, are reproduced in microfilm. If for instance, ten meter long diagrams correspond to ten centimeters of microfilm; both the movable member and the sliding speed of the diagram relative to the rectangular beam of radiation, are reduced so as to allow for handy movable members, and acceptable sliding speeds. It is clear, that also the slot width must be proportionately reduced; that is, the slot width shall have to change from one millimeter or one-tenth of millimeter to ten microns or to a micron or even less.

The radiation shall have in these cases a wave length ten, hundred and thousand times smaller than the light radiation. It is then practical to use as a source of radiation a natural or artificial (radioactive isotope) radioactive body, and, in place of the photo-resistive cell, or vacuum cell, or gas cell, or photomultiplier, there will be used a radio-electric transductor consisting of a Geiger tube or of a photomultiplying crystal, followed by an integrating device that transforms the quantity of impulses per second in an electric voltage. In preparing the microfilm it will be necessary to reckon with the nature of the radiation or of the radioactive emanation used.

The ways of practical embodiment of the device according to the invention are very varied.

The annexed drawings illustrate merely by way of a nonlimiting illustration several schemes of apparatus according to the invention, and precisely:

Figure 1:
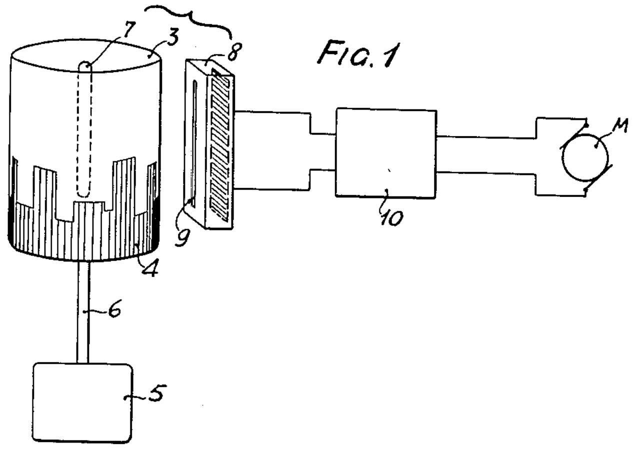
Fig. 1 is a schematic view of the device with a single diagram mounted on a revolving member and photoelectric transduction by transparency.

The scheme of Fig. 1 comprises a cylinder or drum 3, of transparent material, whereon there is reproduced a diagram 4, of different transparency, said drum 3 being made to revolve about its axis by action of a motor 5 driving directly or through a speed changing gear, the shaft 6 of drum 3. Along the axis of said cylinder there is arranged the light source represented by a light tube 7.

The diagram 4 may even be obtained by simply tracing the diagram or curve corresponding to the wanted electronic program on a sheet of transparent paper, corresponding to the development in a plane of the cylinder surface 3 and applying then said paper sheet on said cylinder surface, also transparent.

Laterally to the cylinder 3 there is arranged a photoelectric cell 8, provided with a narrow slot 9, parallel to the cylinder axis. The electric voltage resulting from the transduction of the light radiation, as controlled by the rotating diagram 4, is amplified in amplifier 10 of any suitable type, and the output voltage thereof may be used for instance to feed an electric motor M, actuating a machine tool or a calculating machine.

It is easily understood how the operation of the machine, driven from motor M, follows according to the schedule or law represented in diagram 4. It is further clear how such a diagram or law may be very quickly and simply varied by substituting on cylinder 3, to the sheet with diagram 4, another sheet with a different curve.

One single device can evidently serve to control the automatic or semiautomatic production of the same piece, simultaneously on several identical machine tools.

Machine tools, electronic welding machines etc. can be supplied to the customer with a set of printed or lithographed sheets containing the electronic schedules of the pieces that can be produced by the machine as supplied.

Figure 2:
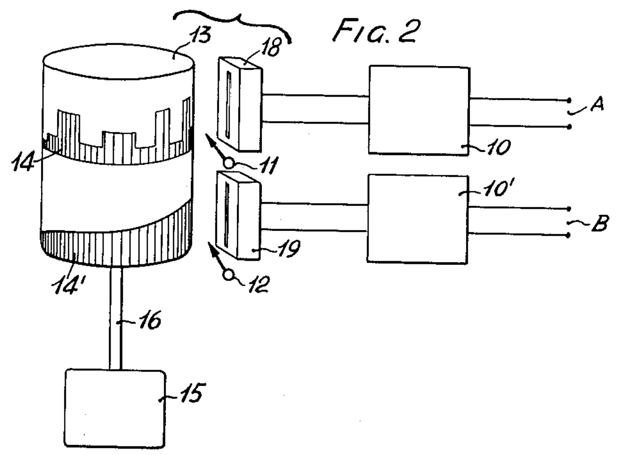
Fig. 2 is a schematic view of a similar device, however with a double diagram, and photoelectric transduction by reflection.

In the example according to Fig. 2, the cylinder 13 carries two diagrams 14 and 14', and is made to revolve, even in this instance, by a motor 15 through a shaft 16.

The diagrams 14 and 14' are traced in such a material or in such a way as to reflect the radiations of two apposite sources 11 and 12 (provided with suitable optical devices), said reflections taking place so as to send the beams from sources **11*a* and 12, respectively, on the photoelectric cells 18 and 19**.

The output voltages from said cells are amplified respectively by means of amplifiers 10 and 10' and, in the instance as illustrated, may feed voltage A to a pair of plates of an oscillograph, and voltage B, originated from a diagram corresponding to a time base unit may be applied to the other pair of plates of the same oscillograph.

Naturally, the revolving cylinders carrying the diagrams may have a directrix different from a circle, the material carrying the diagram may be of any suitable type such as paper, cloth, a plastic material film, or else even a metal or a suitable insulating material, or other suitable opaque material, should it be reflecting rather than transparent.

Similarly, the diagram may be obtained by drawing, etching, photography, print, lithography or any other suitable process.

The movement of rotation, or the alternating motion according to predetermined laws, of the cylinder or of the movable member with any whatever directrix, may be obtained with a simultaneous motion of axial displacement according to predetermined laws, or according to other types or predetermined displacements, so as to obtain that the diagram develops along a helical line or other geometrical figure so as to result as long as desired.

The device may be used for instance to generate oscillographic not interlaced reticle of predetermined characteristics, for laboratory or industrial purposes of TV techniques and the like. In such a case, voltage A of Fig. 2 may correspond to the frame axis and voltage B to the line axis or vice versa. Or else, it can be used to realize the impulse system for TV transmitters interwaving, with any number of frames and lines, with very few photomultipliers, instead of with complicated devices having several tens or hundreds of electronic tubes.

Figure 4:
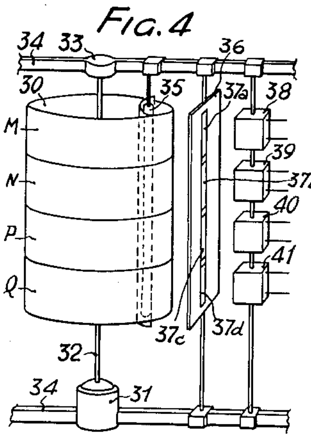
Fig. 4 illustrates schematically another application of the invention, and namely a device for generating interlaced systems of impulses for TV scanning.

In Fig. 4 there is realized by way of example one among several types of devices deriving from the present invention, for generating an impulse system for TV interwavings with 25 complete frames and 625 lines.

Figure 5:
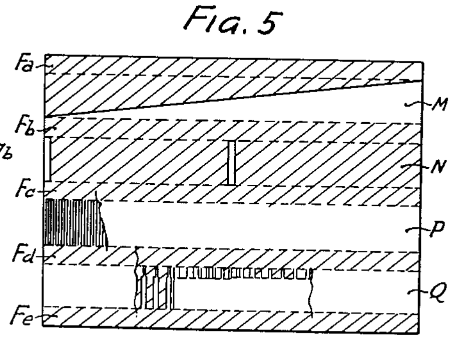
Fig. 5 shows, developed in a plane, the four diagrams to be applied on the revolving cylinder of Fig. 4, for generating the respective impulses.

In Fig. 4 with 30 there is indicated the revolving cylinder carrying the four diagrams M, N, P and Q, illustrated developed in Fig. 5, and corresponding: the first to the time base for the oscillographic control, the second, or diagram N, for the frame synchronizing impulses for the vertical time base of the analyzing camera tube; the third, or diagram P, the line synchronizing impulses for the horizontal time base of the analyzing camera tube, and the fourth, or diagram Q, for the line synchronizing, frame equalizing, and erasing impulses, to be united to the video signal and transmitted together with same.

Said diagrams present also some separation bands, indicated in Fig. 5*a* with F*a*, F*b*, F*c*, F*d*, and F*e*, separating one from the other and limiting the four above cited diagrams.

The cylinder 30 is driven by a motor 31 and its shaft 32 is journaled on top with the bearing 33 carried on the frame 34. Inside cylinder 30, which will be made of transparent material, there is arranged the light source 35, and, externally to the cylinder and in front of said source 35, there is placed a blind 36 provided with four slots **37*a*, 37*b*, 37*c* and 37*d*, which will exactly be in front of the four diagrams M, N, P and Q, respectively. Behind the blind 36 and in correspondence with each of the slots mentioned above, there is a photo-multiplier 38, 39, 40 and 41**, respectively, which feed the corresponding circuits of the TV transmitter.

Naturally, even in this case, the device could also operate by reflection rather than by transparency.

Figure 6:
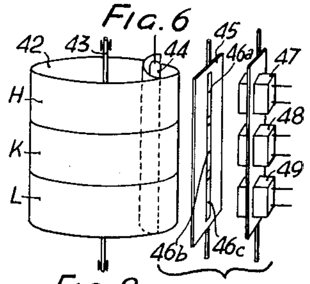
Fig. 6 shows another application of the invention and precisely a device for generating phase displaced waves as necessary for instance for lines of delay in multiple telephone circuits, or polyphase currents having whatever form.

The example in Fig. 6 illustrates a device for generating lines of delay, for multiple telephone circuits of the like, or for generating systems of polyphase currents having any wanted frequency and wave form, with any desired phase displacement. Naturally, the number of phases generated by this means could be any whatsoever.

More precisely, even in this instance, there is a cylinder 42, on which there are carried three diagrams H, K, L, said cylinder being rotatable about its axis 43, driven by a motor or through a suitable transmission gear, and in its inside there is placed a light source 44, facing an outside blind 45 provided with three slots **46*a*, 46*b*, and 46*c*, respectively, corresponding to the three diagrams, and behind which there are disposed the three photoelectric transductors 47, 48 and 49**.

Figure 8:
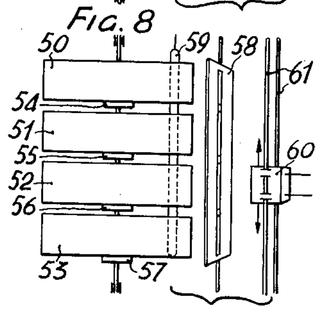
Fig. 8 illustrates a device, similar to the preceding ones, and adapted to generate four electric currents having a triangular wave form and frequencies multiple of 10 one with respect to the other.
Figure 9:
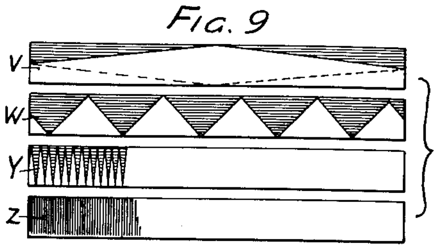
Fig. 9 illustrates schematically the diagrams applicable on the revolving drums of Fig. 8 and corresponding one to frequency 1, and the others respectively, to frequencies of 10, 100, and 1000.

The example in Figs. 8 and 9 illustrates a new type of generator of electric currents having any desired wave form and frequency, there being practically no limitation for the lowest frequency, and the highest frequency limit being conditioned only by the time constant of the transductor, either photoelectric, radio-electric, or of other type.

In this example, wherein there are foreseen four different diagrams V, W, Y, Z, there are four separate cylinders 50, 51, 52, 53 driven from a single motor (not shown), through four different speed multiplying or reducing gears 54, 55, 56 and 57 respectively, so as to allow to have every cylinder rotating at a speed independent from that of the others.

The device is completed also in this case by a blind 58 with a slot in correspondence of each cylinder, a light source 59 placed inside the cylinders and, for sake of simplicity, in this instance there is foreseen a single transductor 60, slidable on guides 61 so that it may be brought according to needs, in correspondence with each of the cylinders 50, 51, 52 and 53.

In the case as illustrated, the diagrams, V, W, Y and Z will supply waves having a triangular shape and at frequencies which will stay to each other in the ratios of 1/10, 1/100, and 1/1000, if the rotating speeds are equal. It will thus be possible to obtain also a frequency of one cycle per second, by means of diagram V, and its control may be obtained through micrometric adjustment of the motor speed on an oscillographic screen, by comparison with that derived from an accurate pendulum, by photoelectric method. Such a comparison will ensure the absolute accuracy of the frequency also of the other diagrams.

It is understandable now, by dividing or multiplying by ten the speed of the motor driving the above mentioned cylinders, there will be obtained other four frequencies divided or multiplied by them, in respect to the preceding ones. Of course, if instead of a single transducer 60 there be four, it should be possible to obtain simultaneously the four desired frequencies which would stand to each other in ratios depending from the diagrams and from the speed ratios of the respective cylinders. Such a device allows therefore to obtain not only a certain frequency, with a given wave form and with absolute accuracy, but also to obtain simultaneously the multiple and submultiple frequencies, with the same identical basic wave shape, in phase or out of phase, in respect to the basic frequency.

Figure 7:
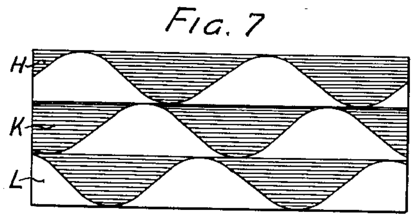
Fig. 7 illustrates, by way of example, and developed in a plane, three diagrams, phase displaced to each other, for generating said waves.

Furthermore, a device of this kind allows to obtain the harmonics and subharmonics of a given frequency, but also the frequencies derived from the basic one, multiplying same by not whole figures. In order to obtain this it will suffice that a diagram, as one of those illustrated in Figs. 7 or 9, be traced on a strip of elastic material, that be stretchable to any desired length so as to make it applicable on a rotating member of a diameter variable with continuity and in a micrometric way. It is understandable then how, while maintaining constant the speed or rotation of the cylinder, the frequency of the oscillating magnitude transmitted by the transductor, may result variable with continuity, thus supplying frequencies derived from the basic one multiplied by any whatever rational or irrational ratio.

It is also possible, by means of the device in question, to obtain the precise reproduction of a given wave form through dosing of harmonics, since there is theoretically no limitation to the number of revolving members and transductors.

According to another form of embodiment, the movable member may also be realized in the form of a strip or film, carrying the desired curve or diagram, and movable in front of a source of light radiations, invisible or emanating from natural or artificial radio-active sources, and which, by transparency or reflection are brought to bear on one or more photoelectric cells or on radiotransductors for radioactive sources, or for that particular radiation of any kind emitted by the above mentioned source.

For evident reasons of size and simplicity, it is clearly understandable how the drawings on the movable strips may be suitably reduced before in microfilm.

The strip or film may be in the form of an endless belting of a certain development, or else it can be unwound and rewound simultaneously on drums, so that a portion of it may be hit, from the back, if transparent, or from the front, if adapted to reflect, by the chosen radiation which will then reach the photo- or radio-electric transductor, or the impulse meter, if the radiation source is a radioactive one.

Figure 3:
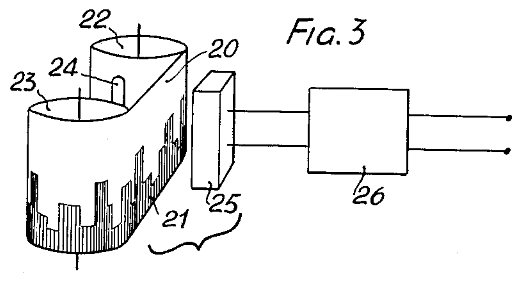
Fig. 3 is a schematic view of another somewhat varied form of embodiment.

In the case of diagrams that do not repeat themselves in cycles, and are of remarkable length even reduced in microfilms, the strip may be wound on two drums, as schematically illustrated in Fig. 3. The transparent film strip 20, carrying the curve 21, unwinds from the drum 22 and winds on drum 23 so that it slides, at the desired speed, in front of the light source, or of a nonluminous radiating source, or else of a radioactive source, schematically indicated with 24. These beams, after having passed through the film 20, reach the transductor 25 to be transformed in an electric voltage which, amplified if necessary by means of amplifier 26, may be utilized for one of the purposes considered above.

Figure 10:
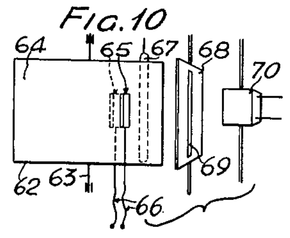
Fig. 10 illustrates another application of the invention according to which by any known or preferred system of recording, there are effected, successively and at a very short time interval, the tracing, under electric control, of a diagram and the successive transformation of same in a control signal through a transductor of a type as those used for the other applications.
Figure 11:
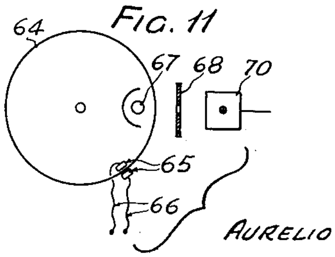
Fig. 11 illustrates the plan view of the same device of Fig. 10.

The device object of the present invention may also serve for recording an electronic diagram obtained with the transformation of nonelectric magnitudes in electric ones, or a diagram of any frequency and shape, such diagrams being able to constitute the law of variation of a magnitude to be controlled. Such an application is schematically represented in Figs. 10 and 11.

The recording system may be any of the many already known, such as the variable area one, or the variable density one, or the like. The reproduction of the diagram thus recorded, may be almost instantaneous or delayed by a more or less long time interval. The example as illustrated in Figs. 10 and 11 is based on a variable density recording of a diagram suitable for actuating and controlling machine tools or for other control purposes.

In this instance, on the suitable frame of a revolving drum 62, rotatable about shaft 63, there is stretched a strip of cloth or other suitable transparent material 64, on which there will be effected the recording; by means of two brushes 65, connected into an electric circuit 66, and such as to blacken more or less the strip 64, in the corresponding zone, according to the current passing through said brushes 65 and strip 64. There is thus obtained a variable density diagram which soon after its tracing will slide between the light source 67 and the blind 68 provided with slot 69, so that on transducer 70 will arrive rays controlled by the just traced diagram and said transductor will control as usual the circuit affecting the machine tool or other machine or system which it is wanted to control by the diagram carried on strip 64. In the instance as illustrated, the point of recording of the diagram (that is the brushes 65) is angularly spaced from the light source 67 and slot 69, by an angle of 72°; thus, assuming that drum 62 revolves very slowly and namely at a speed of one revolution per second, the control operation through the circuit fed from transductor 70 takes place two-tenths of a second after the recording effected by brushes 65; in other words, said regulation, if controlled by the very quantity to be controlled, and with the drum revolving at a speed of 50 cycles per second, takes place one millisecond after the recording. This delay may be reduced to zero adopting transparent brushes for the recording.

This system is particularly advantageous even in the case of multiple regulations that have to take place at very short time intervals, since such a system allows for phase displacements and readiness of control as no other system known heretofore.

Of course all that has been described and illustrated above should be understood to be only in the way of examples, while many variants of embodiment may be easily devised by who is skilled in the art, but all these variations will be in the scope of the present invention.

In particular, the radiations as used may have any wanted wave length and the transductors may be of any type desired and suitable for every particular radiation employed. When radioactive substances are used, said transductors are to be substituted by impulse counters.

What I claim is:

1. Apparatus for generating a plurality of electrical signals having a constant mutual phase relationship, comprising a radioactive ray source, a modulating member of normally radioactive impervious microfilm whereon said signals are manifested by means of predetermined radioactive impervious areas thereon, said signal areas being arranged in separate paths and being predetermined in shape for desired respective output wave shapes, the signal areas being disposed on said microfilm in said predetermined mutual phase relationship with respect to each other, whereby radioactive emanations from said source pass through said microfilm except for the impervious areas thereof in timing and amplitude corresponding to the desired respective wave shapes, mechanism for effecting relative rotation between said source and said microfilm, and transducer means individual to each of said signal paths for manifesting a signal corresponding to the respective modulating effects thereof.

2. An apparatus as set forth in claim 1, wherein said microfilm has a grain size of less than one one-hundredth of a micron.

3. Apparatus for generating a plurality of periodic electric voltages or currents in constant mutual phase relationship, such apparatus comprising an endless support formed into a cylinder and carrying a plurality of oscillograms, the circumferential length of such support being equal to or a multiple of the lowest common multiple of the effective wave lengths of each of the individual oscillograms and such wave lengths being related in a simple numerical manner; a radioactive isotope providing a source of radiation; means to rotate said support about its cylindrical axis relative to said source of radiation to effect simultaneous scanning of the individual oscillograms by such radiation; and an individual transducer associated with each oscillogram and disposed in such a position as to receive the radiation after modulation by the associated oscillogram, such transducers transforming the modulated radiations into periodic electric voltages or currents in constant mutual phase relationship.

4. Apparatus according to claim 3, comprising a rotating cylinder made of material transparent to the radiation, and carrying in an interchangeable manner on its cylindrical wall a sheet of suitable material carrying the said oscillograms, and one source of radiations mounted inside said cylinder, said oscillograms being formed of a material that is opaque to the radiations from said source so as to modulate said radiations, the transducers being placed outside of the cylinder and being adapted to receive the radiations modulated by the said oscillograms.

5. Apparatus according to claim 3, wherein a revolving cylinder is combined with a source of radiation mounted outside the cylinder and with transducers placed inside said cylinder, the oscillograms carried by the cylinder being formed of a material opaque to the radiations emitted from the source on a sheet transparent to same and applied in an interchangeable manner on said cylinder.

6. Apparatus according to claim 3, wherein a revolving cylinder is combined with an external source of suitable radiations, and carries on its outer surface oscillograms which affect the radiations from said source that hit it and are reflected by it before striking the transducers also located outside the cylinder.

7. Apparatus according to claim 1, characterized in that the said oscillograms are reproduced on microfilm by a photographic reduction process.

References Cited in the file of this patent

UNITED STATES PATENTS

| | | |
|---|---|---|
| 2,014,741 | Lesti | Sept. 17, 1935 |
| 2,153,178 | Fitch | Apr. 4, 1939 |
| 2,462,263 | Haynes | Feb. 22, 1949 |
| 2,561,869 | Kent | July 24, 1951 |
| 2,601,392 | Hammond | June 24, 1952 |
| 2,628,539 | Neergaard | Feb. 17, 1953 |
| 2,679,644 | Lippel et al. | May 25, 1954 |
| 2,747,797 | Beaumont | May 29, 1956 |
| 2,796,598 | Cartwright | June 18, 1957 |
| 2,829,825 | Doll | Apr. 8, 1958 |

FOREIGN PATENTS

| | | |
|---|---|---|
| 47,233 | France | Mar. 24, 1936 |
| 760,288 | Germany | Apr. 22, 1954 |